(12) United States Patent
Dong et al.

(10) Patent No.: US 9,206,529 B2
(45) Date of Patent: Dec. 8, 2015

(54) PREPARATION METHODS OF FILTER ELEMENT FOR SWIFT AND HIGHLY EFFICIENT ADSORPTION OF CS

(71) Applicant: THE FIRST INSTITUTE OF OCEANOGRAPHY, STATE OCEANIC ADMINISTRATION, Qingdao (CN)

(72) Inventors: Zhenfang Dong, Qingdao (CN); Deyi Ma, Qingdao (CN); Hongqi Shi, Qingdao (CN)

(73) Assignee: The First Institute of Oceanography, State Oceanic Administration, Qingdao, Shandong (CN)

( * ) Notice: Subject to any disclaimer, the term of this patent is extended or adjusted under 35 U.S.C. 154(b) by 46 days.

(21) Appl. No.: 14/267,457

(22) Filed: May 1, 2014

(65) Prior Publication Data

US 2015/0035194 A1 Feb. 5, 2015

(30) Foreign Application Priority Data

Aug. 1, 2013 (CN) .......................... 2013 1 0331819

(51) Int. Cl.
| | |
|---|---|
| B05D 1/00 | (2006.01) |
| B05D 1/18 | (2006.01) |
| D01D 7/00 | (2006.01) |
| D01D 10/02 | (2006.01) |
| D01F 1/00 | (2006.01) |
| D06M 11/68 | (2006.01) |
| D01D 5/08 | (2006.01) |
| B05D 3/02 | (2006.01) |
| B01J 20/28 | (2006.01) |
| D01F 1/10 | (2006.01) |
| B01J 20/26 | (2006.01) |
| B01J 20/32 | (2006.01) |
| C02F 1/28 | (2006.01) |
| B01J 20/02 | (2006.01) |
| C08K 3/32 | (2006.01) |
| D01D 5/098 | (2006.01) |
| D01F 6/06 | (2006.01) |
| C02F 101/00 | (2006.01) |

(52) U.S. Cl.
CPC ............... *D01D 5/08* (2013.01); *B01J 20/0218* (2013.01); *B01J 20/0274* (2013.01); *B01J 20/261* (2013.01); *B01J 20/28038* (2013.01); *B01J 20/321* (2013.01); *B01J 20/3236* (2013.01); *B01J 20/3293* (2013.01); *B05D 3/0254* (2013.01); *C02F 1/288* (2013.01); *D01F 1/10* (2013.01); *C02F 2101/006* (2013.01); *C08K 2003/322* (2013.01); *D01D 5/0985* (2013.01); *D01F 6/06* (2013.01)

(58) Field of Classification Search
CPC .......... B05D 1/00; B05D 1/18; B05D 3/0254; B05D 2301/10; C08K 3/08; C08K 2003/322; D01D 5/08; D01D 5/0985; D01D 7/00; D01D 10/02; D01F 1/00; D01F 1/10; D06M 11/68
USPC .................... 264/129, 136, 137, 211, 211.12, 264/211.17, 211.2, 234; 427/376.1, 430.1, 427/434.2; 524/406, 416
See application file for complete search history.

(56) References Cited

U.S. PATENT DOCUMENTS

| 4,115,351 A * | 9/1978 | Joh ........................... 524/416 X |
| 4,500,667 A * | 2/1985 | Polak et al. ................... 524/406 |
| 2012/0144957 A1* | 6/2012 | Varshney et al. ................ 75/393 |

FOREIGN PATENT DOCUMENTS

JP 2014087735 A * 5/2014

* cited by examiner

*Primary Examiner* — Leo B Tentoni
(74) *Attorney, Agent, or Firm* — Buchanan Ingersoll & Rooney PC

(57) ABSTRACT

A preparation method of filter element for swift and highly efficient adsorption of Cs includes the following steps: to a substrate material, adding a coupling agent with 1-3 wt % and ammonium phosphomolybdate with 1-10 wt %, based on the weight of the substrate material; heating to 160~220° C.; stirring and mixing evenly so that the substrate material is combined with ammonium phosphomolybdate; spining through 5 μm micropore, the spun filament forming adsorbent filter element with a thickness of 5~50 mm in the rotational cylinder framework material; evenly coating ammonium phosphomolybdate on the outer surface of the adsorbent filter element; and stabilizing and implementing an aging process by heating to 80~120° C. for 3-12 h. The filter element prepared by this method provides an excellent water permeability, oxidization resistance, long-term immersion in hot water of below 100° C., radiation decomposition resistance, stable adsorption, swift detection, high efficiency and precision.

7 Claims, 3 Drawing Sheets

PREPARATION METHODS OF FILTER ELEMENT FOR SWIFT AND HIGHLY EFFICIENT ADSORPTION OF CS

TECHNOLOGICAL FIELDS

The invention relates to the adsorption materials of radioactive substance; in particular, the preparation methods of filter element for swift and highly efficient adsorption of Cs.

BACKGROUND

Currently, the Cs adsorbing materials mainly include AMP-PAN resins, CuFeCN-type resins and natural minerals. These materials feature slow adsorption, long balancing time and low adsorption efficiency. Further, inspection of adsorption rate is required when used in the environmental monitoring. It takes about 10 h to process one sample. The volume of water sample for adsorption and treatment is at the level of several tens of liters.

As the research materials for concentrated adsorption of Cs in nuclear wastewater, AMP, CuFeCN, zeolite, kaolin, diatomite and iron ore are used. These materials feature lengthy processes and small adsorption capacity. The adsorption rate is 40~95%. Therefore, the existing materials for adsorbing Cs suffer from such problems as low adsorption rate and small adsorption flow. Most of the materials have an adsorption rate of below 95% with long adsorption time and small velocity. The balanced adsorption takes several tens of hours. Therefore, these materials are not suitable for swift and highly efficient adsorption.

For instance, after the Fukushima nuclear accident on Mar. 11, 2011, U.S. WHOI investigated the radioactive impact of the Fukushima nuclear accident on the international cooperation voyages in mid-July 2011. K. Buesseler adopted AMP-PAN resin with an adsorption rate of 95% and the seawater sample velocity of about 35 ml/min. It took about 600 minutes to treat 20 L seawater sample. Although adsorption pillar realized vessel operation, it consumed a huge amount of time. Further, the adsorption rate of the adsorption pillar needed to be confirmed by ICP-MS measurement of the residual and stable Cs in the seawater past through the adsorption pillar, thereby making an accurate calculation of radioactive Cs in the seawater sample.

According to the existing marine radioactive measurement technologies owned by International Atomic Energy Agency (IAEA), it requires collecting a huge amount of seawater sample and transporting to the land base laboratory for analysis and measurement.

In summary, the existing materials for adsorbing Cs suffer from low speed and efficiency.

SUMMARY

To solve the existing technical problems, the invention aims to provide the preparation methods of filter element for swift and highly efficient adsorption of Cs. One embodiment comprises the following steps:

1) Modification of substrate material:

To a substrate material is added 1-3 wt % of a coupling agent and 1-10 wt % of ammonium phosphomolybdate, based on the weight of the substrate material. The mixture is heated to 160~220° C. with stirring, to thereby evenly combine the substrate material with ammonium phosphomolybdate;

2) Melt blowing and molding of filter element:

The material prepared in 1) is spun through 5 μm micropore. The spun filament forms adsorbent filter element with a thickness of 5~50 mm in the rotational cylinder framework material;

3) Coating of filter element:

Ammonium phosphomolybdate is evenly coated on the surface of the adsorbent filter element prepared in 2) so that the newly coated ammonium phosphomolybdate on the surface is combined with the ammonium phosphomolybdate inside the substrate material; and 4) Stabilization and aging treatment of filter element:

The filter element prepared in 3) is stabilized and aging processed by heating to 80~120° C. for 3-12 h, to thereby obtain the filter element for swift and highly efficient adsorption of Cs.

In an embodiment, the coupling agent specified in 1) comprises methyl methacrylate or styrene.

In another embodiment, the framework material specified in 2) comprises a hollow polypropylene melt blowing pipe with a nominal granularity of 5 μm.

In another embodiment, the 3) comprises: dissolving ammonium phosphomolybdate into aqueous ammonia with a concentration of 0.5 mol/L; the weight percentage of AMP is 1-10%; then immersing the adsorbent filter element prepared in 2) into the above ammonium phosphomolybdate solution at 10-95° C., pH=1-5 and under vacuum for 1 h; and then rinsing the adsorbent filter element with 0.5 mol/L $HNO_3$ solution until $HNO_3$ cleaning fluid becomes clear. The coated AMP formed on the surface of the adsorbent filter element is not washed out and is less than 1 μm in thickness.

In another embodiment, the substrate material in 1) comprises PP and the coupling agent comprises methyl methacrylate with a weight percentage of 2%; the ammonium phosphomolybdate has a weight percentage of 5%; and the heating temperature is 190° C.

In a further embodiment, in 2), the spun filament forms adsorbent filter element with a thickness of 30 mm in the rotational cylinder framework material.

In another further embodiment, the coating procedure in 3) is as follows: dissolving ammonium phosphomolybdate into aqueous ammonia with a concentration of 0.5 mol/L; once the weight percentage of ammonium phosphomolybdate reaches 1%, immersing the adsorbent filter element prepared in 2) into the above ammonium phosphomolybdate solution at 95° C., pH=1 and under vacuum for 1 h; and then rinsing the adsorbent filter element with 0.5 mol/L $HNO_3$ solution until $HNO_3$ cleaning fluid becomes clear. The coated ammonium phosphomolybdate formed on the surface of the adsorbent filter element is less than 1 μm in thickness.

In one embodiment, the substrate material in 1) comprises PES and the coupling agent comprises styrene with a weight percentage of 3%; the ammonium phosphomolybdate has a weight percentage of 10%; and the heating temperature is 220° C.

In a further embodiment, in 2), the spun filament forms the adsorbent filter element with a thickness of 50 mm in the rotational cylinder framework material.

In a further embodiment, the coating procedure in 3) is as follows: dissolving ammonium phosphomolybdate into aqueous ammonia with a concentration of 0.5 mol/L; once the weight percentage of ammonium phosphomolybdate reaches 1%, immersing the adsorbent filter element prepared in 2) into the above ammonium phosphomolybdate solution at 95° C., pH=1 and under vacuum for 1 h; and then rinsing the adsorbent filter element with 0.5 mol/L HNO$_3$ solution until HNO$_3$ cleaning fluid becomes clear. The coated ammonium phosphomolybdate formed on the surface of the adsorbent filter element is less than 1 µm in thickness.

In one embodiment, the substrate material in 1) comprises PP and the coupling agent comprises methyl methacrylate with a weight percentage of 2%; the ammonium phosphomolybdate has a weight percentage of 5%; and the heating temperature is 190° C.

In a further embodiment, in 2), the spun filament forms the adsorbent filter element with a thickness of 30 mm in the rotational cylinder framework material.

In a further embodiment, the coating procedure in 3) is as follows: dissolving ammonium phosphomolybdate into aqueous ammonia with a concentration of 0.5 mol/L; once the weight percentage of ammonium phosphomolybdate reaches 5 %, immersing the adsorbent filter element prepared in 2) into the above ammonium phosphomolybdate solution at 55° C., pH=3 and under vacuum for 1 h; and then rinsing the adsorbent filter element with 0.5 mol/L HNO$_3$ solution until HNO$_3$ cleaning fluid becomes clear. The coated ammonium phosphomolybdate formed on the surface of the adsorbent filter element is less than 1 µm in thickness.

In certain embodiments, the beneficial effects of the invention include:

The swift and highly efficient Cs adsorbing filter element prepared by this invention provides excellent water permeability, oxidization resistance, long-term immersion in hot water of below 100° C., radiation decomposition resistance and stable adsorption. It can be used to treat a seawater sample in 10 minutes that requires 10 h for an AMP-PAN resin. The velocity is 4 L/min and adsorption rate is 99.9%. Further, stable Cs measurement is not needed to confirm the adsorption rate.

DETAILED DESCRIPTION OF THE DRAWINGS

Figure 1:
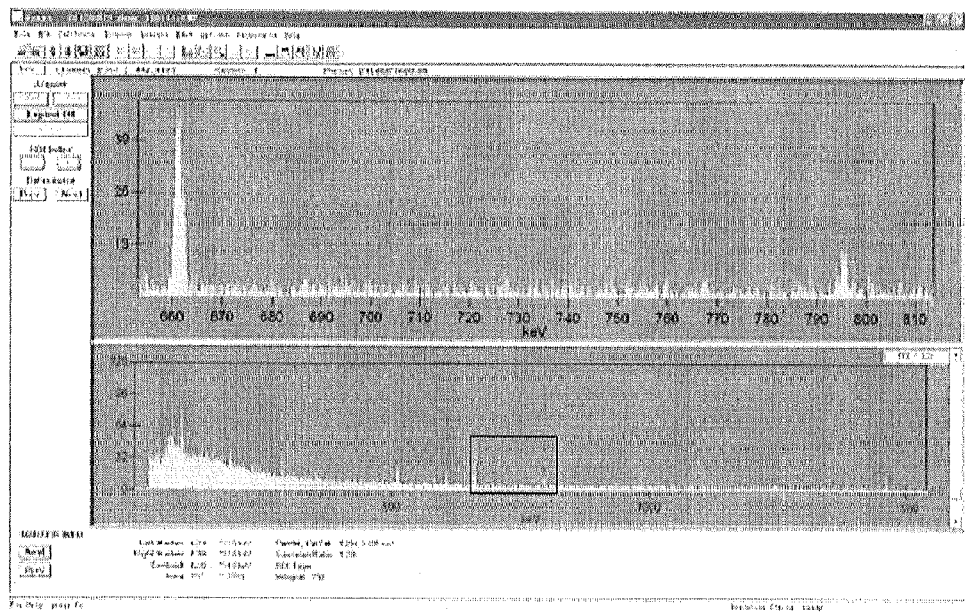
FIG. 1 is the energy spectrogram of Cs adsorbing filter element γ in the surface layer of monitoring sea area in Sample 01.
Figure 2:
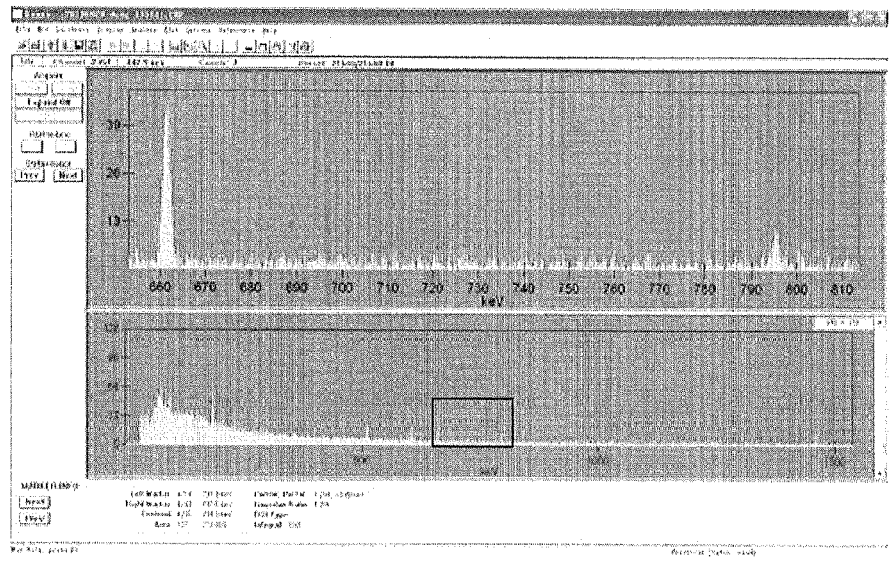
FIG. 2 is the energy spectrogram of Cs adsorbing filter element γ in the surface layer of China's coastal seawater in Sample 03.
Figure 3:
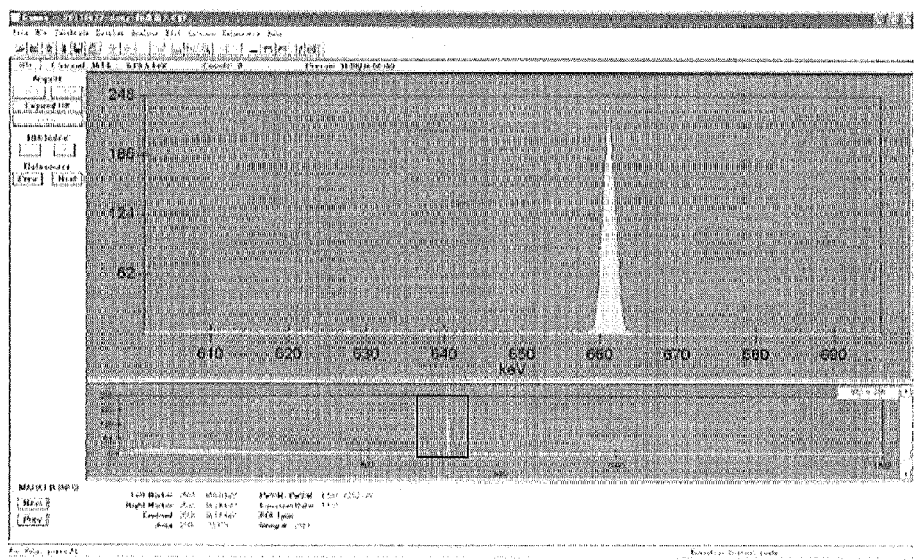
FIG. 3 is the energy spectrogram of standard $^{137}$Cs (118.3 Bq) adsorption filter element γ.

In FIG. 1, FIG. 2 and FIG. 3, the upper part represents the magnified picture of box in the lower part.

EXEMPLARY EMBODIMENTS

The preparation methods of filter element for swift and highly efficient adsorption of Cs provided by the invention utilize PP or PES as the substrate material for micropore spinning; form an adsorbent filter element in the cylinder framework material and then coat the adsorbent filter element with AMP. The invention is described in detail with the following examples. However, the scope of invention is not limited to these examples.

Example 1

The preparation method of filter element for swift and highly efficient adsorption of Cs is as follows:
1) Modification of substrate materials:
To the substrate material PP (polypropylene resin) is added methyl methacrylate with a weight percentage of 1% and AMP (ammonium phosphomolybdate trihydrate) with a weight percentage of 1%. The mixture is heated to 160° C. with stirring and mixed evenly so that PP is combined with AMP.
2) Melt blowing and molding of filter element:
The material prepared in 1) is spun through 5 µm micropore. The spun filament is wound up in the rotational cylinder framework material to form an adsorbent filter element with a thickness of 5 mm. The framework material comprises a hollow polypropylene melt blowing pipe with a nominal granularity of 5 µm.
3) Coating of filter element:
The steps for evenly coating AMP on the outside surface of the adsorbent filter element prepared in 2) are as follows: dissolving AMP into aqueous ammonia with a concentration of 0.5 mol/L, the weight percentage of AMP being 10%; immersing the adsorbent filter element prepared in 2) into the above AMP solution at 10° C., pH=5 and under vacuum for 1 h; and then rinsing the adsorbent filter element with 0.5 mol/L HNO$_3$ solution until HNO$_3$ cleaning fluid becomes clear. The coated AMP formed on the surface of the adsorbent filter element is not washed out and is integrated with AMP in the substrate material. The coated AMP on the surface is less than 1 µm in thickness. The washed-out AMP is recovered and re-utilized.
4) Stabilization and aging treatment of filter element:
The filter element prepared in 3) is heated to 80° C., stabilized and aging processed for 12 h, to obtain the filter element for swift and highly efficient adsorption of Cs.

Example 2

The preparation method of filter element for swift and highly efficient adsorption of Cs is as follows:
1) Modification of substrate materials:
To the substrate material PES (poly ether sulfone) is added styrene with a weight percentage of 3% and AMP (ammonium phosphomolybdate trihydrate) with a weight percentage of 1%. The mixture is heated to 220° C. with stirring and mixed evenly so that PES is combined with AMP.
2) Melt blowing and molding of filter element:
The material prepared in 1) is spun through 5 µm micropore. The spun filament is wound up in the rotational cylinder framework material to form an adsorbent filter element with a thickness of 50 mm. The framework material comprises a hollow polypropylene melt blowing pipe with a nominal granularity of 5 µm.
3) Coating of filter element:
The steps for evenly coating AMP on the surface of the adsorbent filter element prepared in 2) are as follows: dissolving AMP into aqueous ammonia with a concentration of 0.5 mol/L, the weight percentage of AMP being 1%; and then immersing the adsorbent filter element prepared in 2) into the above AMP solution at 95° C., pH=1 and under vacuum for 1 h; then rinsing the adsorbent filter element with 0.5 mol/L HNO$_3$ solution until HNO$_3$ cleaning fluid becomes clear. The coated AMP formed on the surface of the adsorbent filter element is not washed out and is integrated with AMP in the substrate material. The coated AMP on the surface is less than 1 µm in thickness. The washed-out AMP is recovered and re-utilized.

4) Stabilization and aging treatment of filter element:

The filter element prepared in 3) is heated to 120° C., stabilized and aging processed for 3 h, to obtain the filter element for swift and highly efficient adsorption of Cs.

Example 3

The preparation method of filter element for swift and highly efficient adsorption of Cs is as follows:

1) Modification of substrate materials:

To the substrate materials PP is added methyl methacrylate with a weight percentage of 2% and AMP with a weight percentage of 5%. The mixture is heated to 190° C. with stirring and mixed evenly so that PP is combined with AMP.

2) Melt blowing and molding of filter element:

The material prepared in 1) is spun through 5 µm micropore. The spun filament is wound up in the rotational cylinder framework material to form an adsorbent filter element with a thickness of 30 mm. The framework material comprises a hollow polypropylene melt blowing pipe with a nominal granularity of 5 µm.

3) Coating of filter element:

The steps for evenly coating AMP on the surface of the adsorbent filter element prepared in 2) are as follows: dissolving AMP into aqueous ammonia with a concentration of 0.5 mol/L, the weight percentage of AMP being 5%; then immersing the adsorbent filter element prepared in 2) into the above AMP solution at 55° C., pH=3 and under vacuum for 1 h; and then rinsing the adsorbent filter element with 0.5 mol/L $HNO_3$ solution until $HNO_3$ cleaning fluid becomes clear. The coated AMP formed on the surface of the adsorbent filter element is not washed out and is integrated with AMP in the substrate material. The coated AMP on the surface is less than 1 µm in thickness. The washed-out AMP is recovered and re-utilized.

4) Stabilization and aging treatment of filter element:

The filter element prepared in 3) is heated to 100° C., stabilized and aging processed for 7 h to obtain the filter element for swift and highly efficient adsorption of Cs.

The filter elements prepared by the described methods are applicable to the treatment and emergency disposal of radioactive wastewater from nuclear projects, on-site real-time monitoring of radioactive Cs in the seawater and fresh water, concentration and separation of radioactive Cs upon fuel inadequacy or withdrawal, and concentration and separation in Cs salt chemical processes. The exemplary tests are as follows:

The filter elements prepared in Examples 1-3 are 100 mm in length, 60 mm in outside diameter and 25 mm in inside diameter; and are numbered as Samples 01, 02 and 03, respectively.

(1) On-sea test of Sample 01 for swift and highly efficient adsorption of Cs.

Figure 4:
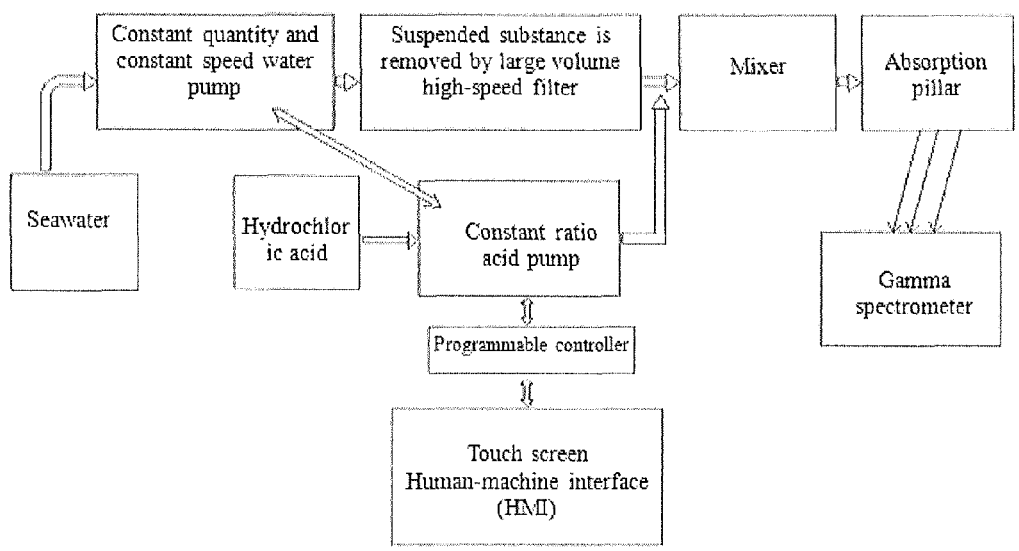
FIG. 4 is the schematic diagram of a real-time monitoring system in the marine radioactive field according to the invention.

In a certain sea area of West Pacific Ocean, a self-made portable marine radioactive real-time monitoring system is adopted. The monitoring system is shown in FIG. 4. The seawater on the surface layer is automatically pumped into the monitoring system. The adsorbent pillar made of filter element prepared according to the invention is able to adsorb radioactive Cs in the seawater. Table 1 summarizes the basic monitoring information.

TABLE 1

Data record of a special monitoring sample in the sea area of West Pacific Ocean

| Frequency of stepping motor of water pump Hz | Velocity of water pump ml/min | Sampling time Min | Sampling volume/L | $^{137}Cs$ $Bq/m^3$ | $^{134}Cs$ $Bq/m^3$ |
|---|---|---|---|---|---|
| 1670 | 2288 | 668 | 1529 | 2.07 ± 0.11 | 0.49 ± 0.06 |

FIG. 1 depicts the energy spectrogram of adsorbent filter element γ in Sample 01.

This set of data forms a sharp contrast with the test done by K. Buesseler. For example, during K. Buesseler's on-site Cs enrichment, the velocity of the seawater is 35 ml/min. In this test of the present invention, the velocity is 2288 ml/min. K. Buesseler treats 20 L in 10 h while this example enriches 1529 L. The $^{134}Cs$ and $^{137}Cs$ activity of the adsorbent filter element is only 0.3~1.4 Bq in such a huge amount of seawater. For 20 L of seawater sample with such acitivity, the activity of measurement source is 0.04 Bq. For the sample with very low activity, it is extremely difficult to measure γ energy spectrum-it is even lower than the lowest detection limit of γ spectrometer. In this test, it takes 6 h to measure the γ energy spectrum for 1529 L seawater with precision of 5%~12%, which can totally meet the monitoring precision requirements. As can be seen from the γ energy spectrum, $^{134}Cs$ and $^{137}Cs$ are clearly detected in the sample. In the absence of the swift and highly efficient Cs adsorbing filter element, several tens of liters of seawater have to be taken to a land laboratory for γ energy spectrum analysis, which makes it impossible to monitor the radioactive pollution of the sea area. Further, since less quantity cannot produce an accurate calculation, several tons of seawater sample are required to be taken to the land laboratory, making analysis operation impossible. Therefore, the swift and highly efficient Cs adsorbing filter element is of great significance. The radioactive monitoring of water environment is a very tiring and complicated task; however, it becomes easier and more convenient with the help of swift and highly efficient Cs adsorbing filter element.

(2) Adsorption rate test of Sample 02 with different velocities

40 L seawater in a testing plastic barrel is acidified with hydrochloric acid in the amount of 1 ml hydrochloric acid per 1 L seawater with stirring. 10 mg of Cs carrier is added to the acidified seawater, followed by 23.6 Bq $^{137}Cs$. The mixture is stirred to mix evenly. The pulse frequency of stepping motor is adjusted to a preset velocity. The adsorption test of filter element is conducted. Once the seawater passes through the filter element, residual $^{137}Cs$ is measured by Cs-137 radioactive chemical analytic method according to GB 6767-86 standard. The measurement results are summarized in Table 2.

TABLE 2

Data record of adsorption test under different velocities

| Velocity (l/min) | Total amount | Measuring time (s) | Counting rate (Bq) | Net counting rate (Bq) | Remark |
|---|---|---|---|---|---|
| 0.6 | 7412 | 58011 | 0.1278 | −0.0024 | Detection limit: 0.003 |
| 1 | 2767 | 21467 | 0.1289 | −0.0013 | |
| 1.2 | 7481 | 57693 | 0.1297 | −0.0005 | |
| 1.4 | 1340 | 10512 | 0.1275 | −0.0027 | |

TABLE 2-continued

Data record of adsorption test under different velocities

| Velocity (l/min) | Total amount | Measuring time (s) | Counting rate (Bq) | Net counting rate (Bq) | Remark |
|---|---|---|---|---|---|
| 1.6 | 5475 | 43319 | 0.1264 | −0.0038 | |
| 1.8 | 7165 | 56172 | 0.1276 | −0.0026 | |
| 3.5 | 7451 | 58046 | 0.1284 | −0.0018 | |
| 4 | 8710 | 68114 | 0.1279 | −0.0023 | |
| Background counting rate | | | 0.1302 | | |

As can be seen from the test of Sample 02, the residual radioactive $^{137}$Cs in the penetrating fluid is lower than the lowest detection limit under different velocities between 0.6 L/min and 4.0 L/min. According to the lowest detection limit, Cs adsorption rate is estimated and measured to be higher than 99.9%. The adsorption rate of Cs adsorbing filter element cannot be 100%. The activity of missing agent $^{137}$CS must be enhanced in order to accurately measure the adsorption rate. The fact that the water sample is able to attain such a high adsorption rate by penetrating the adsorbent filter element only once under different velocities completely meets the demand for the on-site adsorption of water environment.

Compared with the same type of adsorption materials, the filter element prepared according to the invention provides a highly efficient adsorption performance. The environmental radiation monitoring is very time consuming with each measurement requiring several hours or even several days. Large volume, swift and highly efficient adsorption on the site are of vital importance to the environmental monitoring industry.

(3) Seawater adsorption monitoring radioactive Cs test of Sample 03 on the surface layer of China coastal region The velocity is set to be 2320.8 ml/min, the adsorption time is set to be 180 min and the seawater sampling volume is set to be 417.7 L. $^{137}$Cs adsorbent filter element is measured by γ energy spectrum. The γ energy spectrum is shown in FIG. 2. Upon calculation, $^{137}$Cs activity in the seawater on the surface layer of coastal region is 1.15±0.14 Bq/m$^3$. FIG. 3 shows the γ energy spectrogram of standard $^{137}$Cs (118.3 Bq) adsorption filter element, which is adopted for standard scaling. As can be clearly seen by comparing the spectra, the filter element measurement according to the invention enjoys less time and high precision.

According to the seawater filtration test of coastal region, 417 L seawater is adsorbed and the energy spectrum measurement takes 10 hours. The energy spectrum is not clear and sharp. Nonetheless, 662 keV γ characteristic energy spectrum line can be distinguished with measurement precision of only 13%. On the other hand, the energy spectrum measurement of standard $^{137}$Cs (118.3 Bq) filter element for only 1 hour provides an outstanding energy spectrum, where the background can almost be omitted and the measurement precision is much higher accordingly. That is, in the radioactive measurement, the activity of measurement source is of vital importance. Even when the activity of measurement source is very low, the filter element prepared by the invention is able to realize on-site real-time monitoring.

The invention claimed is:

1. A preparation method of filter element for swift and highly efficient adsorption of Cs, the method comprising:
    1) mixing a substrate material, a coupling agent with 1-3 wt % and ammonium phosphomolybdate with 1-10 wt %, based on a weight of the substrate material and heating the mixture to 160~220° C., the substrate material being combined with ammonium phosphomolybdate;
    2) spinning the material prepared in 1) through 5 μm micropore to form an adsorbent filter element with a thickness of 5~50 mm in rotational cylinder framework material;
    3) evenly coating ammonium phosphomolybdate on a surface of the adsorbent filter element obtained in 2) so that ammonium phosphomolybdate is combined with the ammonium phosphomolybdate within the substrate material;
    4) heating the filter element obtained in 3) to 80~120° C. for 3-12 h, thereby obtaining the filter element for swift and highly efficient adsorption of Cs.

2. The method according to claim 1, wherein the coupling agent comprises methyl methacrylate or styrene.

3. The method according to claim 1, wherein the framework material in 2) comprises a hollow polypropylene melt blowing pipe with a nominal granularity of 5 μm.

4. The method according to claim 1, wherein the 3) comprises:
    dissolving ammonium phosphomolybdate (AMP) into aqueous ammonia having a concentration of 0.5 mol/L, a concentration of ammonium phosphomolybdate being 1-10 wt %;
    immersing the adsorbent filter element obtained in 2) in the ammonium phosphomolybdate solution at 10~95° C., pH=1~5 and under vacuum for 1 h;
    rinsing the adsorbent filter element with 0.5 mol/L HNO$_3$ solution until HNO$_3$ cleaning fluid becomes clear, coated AMP on the surface being less than 1 μm in thickness.

5. The method according to claim 1, wherein:
    in 1), the substrate material comprises a polypropylene (PP), the coupling agent comprises methyl methacrylate with a weight percentage of 2%; the ammonium phosphomolybdate has a weight percentage of 5%; and a heating temperature is 190° C.;
    in 2), the adsorbent filter element has a thickness of 30 mm in the rotational cylinder framework material; and
    3) comprises: dissolving ammonium phosphomolybdate into aqueous ammonia having a concentration of 0.5 mol/L to obtain an ammonium phosphomolybdate solution having a weight percentage of ammonium phosphomolybdate of 1%, immersing the adsorbent filter element obtained in 2) into the ammonium phosphomolybdate solution at 95° C., pH=1 and under vacuum for 1 h; and then rinsing the adsorbent filter element with 0.5 mol/L HNO$_3$ solution until HNO$_3$ cleaning fluid becomes clear, coated ammonium phosphomolybdate on the surface being less than 1 μm in thickness.

6. The method according to claim 1, wherein
    in 1), the substrate material comprises a poly ether sulfone (PES), the coupling agent comprises styrene with a weight percentage of 3%; the ammonium phosphomolybdate has a weight percentage of 10%; and a heating temperature is 220° C.;
    in 2), the adsorbent filter element has a thickness of 50 mm in the rotational cylinder framework material; and
    3) comprises: dissolving ammonium phosphomolybdate into aqueous ammonia with a concentration of 0.5 mol/L to obtain an ammonium phosphomolybdate solution having a weight percentage of ammonium phosphomolybdate of 1%, immersing the adsorbent filter element obtained in 2) into the ammonium phosphomolybdate solution at 95° C., pH=1 and under vacuum for 1 h; and then rinsing the adsorbent filter element with 0.5 mol/L HNO$_3$ solution until HNO$_3$ cleaning fluid becomes clear, coated ammonium phosphomolybdate on the surface being less than 1 μm in thickness.

7. The method according to claim 1, wherein
in 1), the substrate material comprises a polypropylene (PP) and the coupling agent comprises methyl methacrylate with a weight percentage of 2%; the ammonium phosphomolybdate has a weight percentage of 5%; a heating temperature is 190° C.;
in 2), the adsorbent filter element has a thickness of 30 mm in the rotational cylinder framework material; and
3) comprises: dissolving ammonium phosphomolybdate into aqueous ammonia with a concentration of 0.5 mol/L to obtain an ammonium phosphomolybdate solution having a weight percentage of ammonium phosphomolybdate of 5%, immersing the adsorbent filter element obtained in 2) into the ammonium phosphomolybdate solution at 55° C., pH=3 and under vacuum for 1 h; and then rinsing the adsorbent filter element with 0.5 mol/L HNO$_3$ solution until HNO$_3$ cleaning fluid becomes clear; coated ammonium phosphomolybdate on the surface being less than 1 μm in thickness.

\* \* \* \* \*